United States Patent [19]

Lowe

[11] 3,754,280

[45] Aug. 21, 1973

[54] APPARATUS FOR PRODUCING RECORDED TRACES OF UNIFORM DENSITY

[75] Inventor: Peter R. Lowe, Englewood, Colo.

[73] Assignee: Honeywell Inc., Minneapolis, Minn.

[22] Filed: Mar. 17, 1972

[21] Appl. No.: 235,536

[52] U.S. Cl. ............................. 346/110 R, 346/136
[51] Int. Cl. ..................................................... G01d
[58] Field of Search ........................ 346/110 R, 136

[56] References Cited
UNITED STATES PATENTS 2,965,434  12/1960  Downs ............................ 346/110 R
3,605,109  9/1971  Tyler ........................... 346/110 R X Primary Examiner—Joseph W. Hartary
Attorney—Arthur H. Swanson et al.

[57] ABSTRACT

The values of a plurality of data signals to be plotted against time as traces on a moving photosensitive record sheet are sampled by being simultaneously compared continuously with a cyclically repeated ramp voltage by a plurality of comparators. Each of the latter produces an output each time that the ramp voltage reaches the value of the corresponding signal. The ramp voltage is synchronized with the horizontal sweep for a fiber optics cathode ray tube, across the optics strip of which the sheet is advanced at right angles. A logic device for each signal unblanks the normally blanked beam of the tube for a period in each sweep to mark a dynamic line on the sheet. Each period is that in which the ramp voltage lies between the two values of the corresponding signal at which the corresponding comparator output is produced for the present and the immediately previous sweeps. When these two values are equal, an RC circuit responsive to the corresponding comparator output, and an amplifier adjusted in accordance with the speed of the sheet, cause the beam to mark a fixed length static line on the sheet having an intensity which is a direct function of the sheet speed.

2 Claims, 4 Drawing Figures

APPARATUS FOR PRODUCING RECORDED TRACES OF UNIFORM DENSITY

BACKGROUND OF THE INVENTION

The present invention relates to graphic recording apparatus of the line scan, sampling type which employs a marking means, such as a cathode ray tube beam, to produce on a moving record medium traces representing the values of electrical signals. Specifically, the invention relates to apparatus of this type which, for each such a signal, produces a trace composed of a series of sequentially produced lines, the lengths and positions of which across the direction of movement of the medium represent sequentially sampled values of the signal. An example of recording apparatus of this type is the apparatus disclosed in the U.S. Tyler et al. Pat. No. 3,605,109.

The trace-forming lines which are produced for each signal by apparatus of the foregoing type, and, specifically, by the apparatus of the above-noted patent, are of two basic types. When the signal has different values for successive samplings, the resulting lines which are produced lie substantially end to end in a direction across the medium in parallel paths, and have lengths which are determined by the respective signal value changes or differences. These lines are so-called dynamic trace lines or dynamic lines, and form so-called dynamic portions of the trace.

When the value of the signal does not change between successive samplings, the resulting lines which are produced lie in a direction across the medium in substantially parallel paths as before, but fall along a path in the direction of medium movement which represents the corresponding steady value of the signal. These lines have a predetermined, fixed length which is common to all of such lines, are so-called static trace lines or static lines, and form so-called static portions of the trace.

As a result of the above-described relationships, the dynamic lines do not in any way cover each other or overlap for any speed at which the medium is moved. However, the static lines overlap along their respective paths in the direction of medium movement to an extent which increases as the speed of medium movement is decreased. Typically, the amount or extent of this overlap starts from zero or no overlap at the highest medium speed, and progressively increases to a maximum as the medium speed is progressively reduced to its minimum valve. As a result, the static trace portions undesirably appear progressively denser and darker relative to the dynamic trace portions for progressively slower medium speeds. In other words, the slower that the medium speed is made, the greater will be the undesirable density contrast between the dynamic and static trace portions.

SUMMARY OF THE INVENTION

Accordingly, it is an object of the present invention to provide improved apparatus of the basic type referred to above which produces records whereon the densities or intensities of both the dynamic and static trace portions are substantially the same, irrespective of the speed with which the record medium was moved while the traces were being recorded. A more specific object of the invention is to provide such improved apparatus for producing such traces of uniform density which does not require unduly complex changes to be made to the previously known type of recording apparatus.

In accomplishing the foregoing and other desirable objects, recording apparatus according to the present invention includes means responsive to the speed of movement of the recording medium to control the intensity of the static lines relative to the intensity of the dynamic lines. This static line intensity is made to be a direct function of the medium speed, whereby the density of the static trace portions is made to be substantially the same as the density of the dynamic trace portions irrespective of the medium speed. When the record medium marking or recording means is a cathode ray tube beam, the beam intensity is desirably made to have a marking level, only when the static lines are being produced, which is a direct function of the medium speed, the value of this marking level being suitably decreased as the medium speed is decreased.

BRIEF DESCRIPTION OF THE DRAWING

A better understanding of the present invention may be had from the following detailed description when read in connection with the accompanying drawing, wherein.

DESCRIPTION OF THE PREFERRED EMBODIMENT

THE APPARATUS OF FIG. 1

Figure 1:
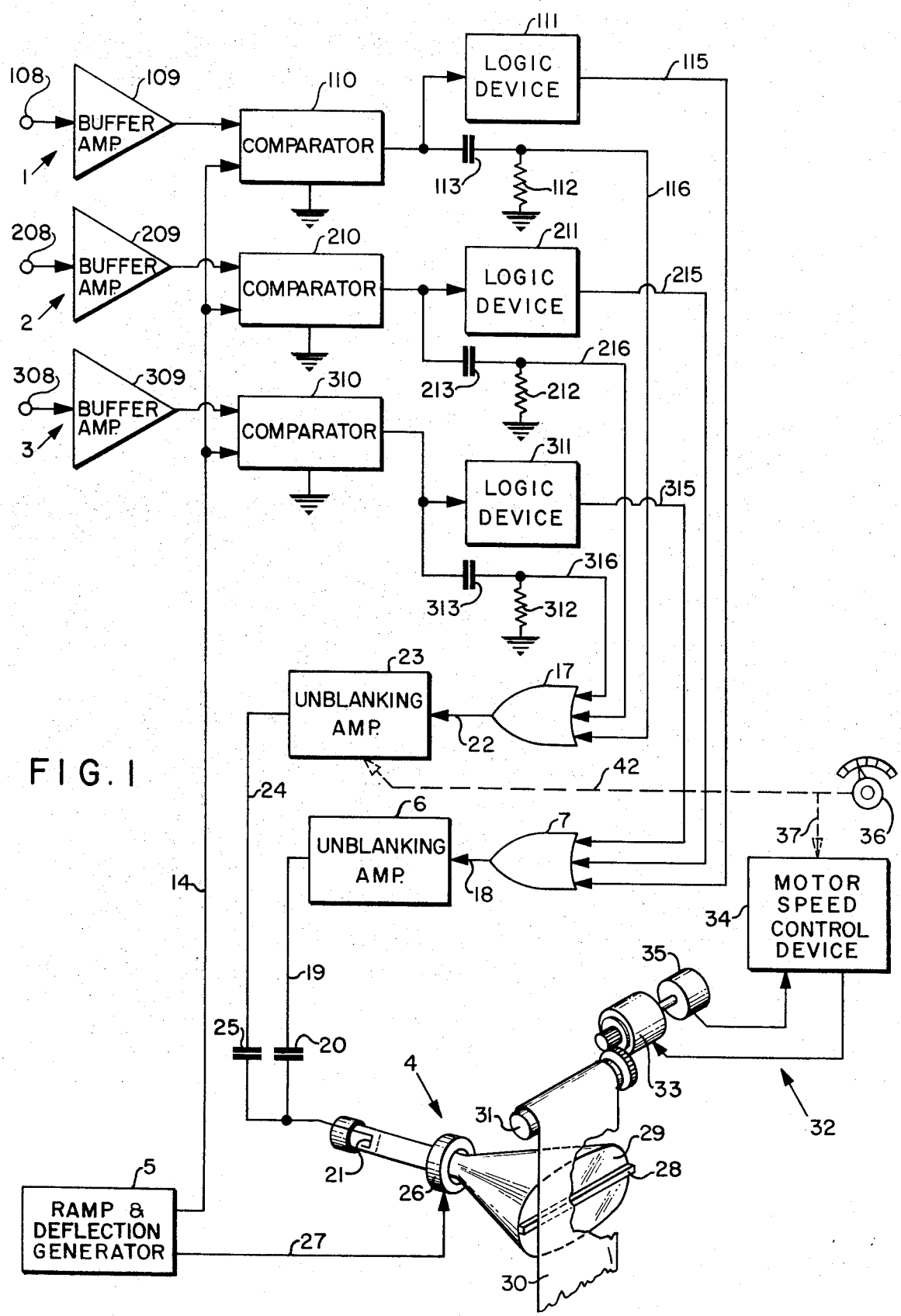
FIG. 1 is a diagram of line scan cathode ray tube recording apparatus embodying the present invention.

The apparatus illustrated in FIG. 1 as a preferred example of apparatus embodying the present invention is basically of the type which is disclosed in the above-noted patent. Thus, the FIG. 1 apparatus is multichannel line scan recording apparatus which is arranged to produce a record of three traces or curves of signal value vs. time, each trace representing the value of a respective one of three data signals. These traces are produced by a cathode ray tube beam operating in successive sweep periods as a marking means on the phosphor of a line scan fiber optics cathode ray tube to provide line scan recording on a photosensitive record medium or sheet which is continuously moved at any of several speeds over the fiber optics strip of the tube. The tube beam produces each of the three traces by effectively producing on the record sheet a transverse line during each of the sweep periods. These lines are the aforementioned non-overlapping dynamic lines, which form dynamic trace portions, when the corresponding signal has sequentially different values, and are the aforementioned overlapping static lines, which form static trace portions, when the corresponding signal value remains constant.

In accordance with the present invention, the FIG. 1 apparatus also includes an adjustable beam intensity controlling device or unblanking amplifier which controls the level of the tube beam marking intensity only when the static lines are being produced. This controlling device is adjusted in accordance with the speed of movement of the record sheet so as to cause the apparatus to make the density of the static trace portions substantially the same as the density of the dynamic trace portions irrespective of the speed of movement of the record sheet.

Consonant with the foregoing, the FIG. 1 apparatus includes data signal channels or circuit portions 1, 2 and 3, a line scan fiber optics cathode ray tube 4, a ramp and sweep deflection signal generator 5 having ramp signal and sweep deflection signal outputs, a first beam intensity controlling device or unblanking amplifier 6, and a master OR gate 7 having three inputs. The amplifier 6 may well be of the form illustrated in FIG. 8 of said patent. The data channel 1 includes an input connection 108, a buffer amplifier 109, a comparator 110, a logic device 111, and static trace means including a resistor 112 and a capacitor 113. The connection 108, which is intended for connection to the source of the first of the three signals to be recorded, is connected to the input of the amplifier 109. The output of the latter is connected to one of the two inputs of the comparator 110, the remaining input of which is connected to the ramp signal output of the generator 5 by way of a ramp signal connection 14. The output of the comparator 110 is connected to the input of the logic device 111, the output of which is connected by a connection 115 to one of the three inputs of the master OR gate.

The device 111 is considered herein to include dynamic trace logic means which are the equivalent of any of the several dynamic line producing arrangements which are shown connected between the comparators and the master OR gates in said patent. For example, the device 111 may consist of the elements 35, 36, 37, 38, 39, and 119 of the arrangement of FIG. 6 of said patent.

The output of the comparator 110 is also connected through the capacitor 113 and a connection 116 to one of the three inputs of a second master OR gate 17. The resistor 112 is connected between the connection 116 and the common connection for the channel circuitry.

The data channel 2 is identical to the channel 1 as just described, and includes an input connection 208, a buffer amplifier 209, a comparator 210, a logic device 211, static trace means including a resistor 212 and a capacitor 213, a connection 215 to an input of the gate 7, and a connection 216 to an input of the gate 17. Also, the data channel 3 is identical to the channels 1 and 2, and includes the elements 308, 309, 310, 311, 312, 313, 315, and 316. The interconnections between the elements of each of the channels 2 and 3 are the same as those for the channel 1, as can be seen from FIG. 1. The connections 208 and 308 are intended for connection to the respective sources of the second and third of the three data signals to be recorded.

The output of the OR gate 7, which gate receives the dynamic trace outputs of the channels 1, 2, and 3, is connected by a connection 18 to the input of the unblanking amplifier 6, while the output of the latter is connected by a connection 19 and a high voltage isolating capacitor 20 to the cathode 21 of the tube 4. The output of the OR gate 17, which gate receives the static trace outputs of the channels 1, 2, and 3, is connected by a connection 22 to the input of a second beam intensity controlling device or unblanking amplifier 23. The output of the latter is connected by a connection 24 and a high voltage isolating capacitor 25 to the cathode 21 of the tube 4.

Associated with the tube 4 is a horizontal deflection coil 26. This coil is connected to the sweep deflection signal output of the generator 5 by a connection 27. The tube 4 is of the known type, having a gun which is powered by the usual power supply means, not shown, and which includes the cathode 21 by which the cathode ray beam of the tube is produced and controlled in intensity. The tube 4 also has the usual fiber optics array or strip 28 inserted into a faceplate 29, and the usual phosphor element, not shown, consisting of a strip-like or band-like coating of phosphor material coated onto the inner surface of the faceplate 29 at least coextensively with the active or usable inboard area of the strip 28.

A photosensitive record sheet 30 is advanced at a desired rate, downwardly in FIG. 1, over the strip 28 from a supply roll 31 by means of a suitable variable or adjustable speed drive means 32. This means may be of any of the well-known arrangements for moving a record sheet through a recording device at any of a plurality of selectable speeds. By way of example, the means 32 is shown in FIG. 1 as being of the type which is disclosed in the U.S. Merz Pat. No. 3,581,175. Thus, the means 32 includes a motor 33 which drives the roll 31 under the control of a motor speed control device 34. The latter is connected to the motor 33 and is supplied with the output of a tachometer generator 35 driven by the motor 33. A speed adjusting or setting knob 36 is coupled to the device 34 by a connection 37. In the manner described in said Merz patent, the motor 33 rotates at a constant speed which is determined by the position to which the knob 36 has been manually adjusted. Accordingly, the record sheet 30 is moved past the tube 4 at a constant speed which is determined by the adjusted position of the knob 36.

Operation of the FIG. 1 Apparatus

The foregoing description covers the construction and arrangement of recording apparatus which is essentially the same as the apparatus of said Tyler et al patent, when including the modification of FIG. 10 thereof, except as to the presence in the present FIG. 1 apparatus of the second unblanking amplifier 23, the second gate 17, and the several connections thereto. With respect to the basic operation of the FIG. 1 apparatus as described so far, it is noted that the generator 5 produces two synchronized output signals. One of these signals is a cathode ray tube sweep deflection signal of the usual ramp or saw-tooth type. This signal is applied to the sweep deflection coil 26 over the connection 27, and causes the beam of the tube 4, when produced, alternately to sweep and fly back in a straight line across the tube phosphor repeatedly in successive sweep periods or sweeps, as will be described in more detail hereinafter. The second of said two generator signals is a ramp voltage signal, the value of which is repeatedly swept between predeterimned minimum and maximum values in synchronism with said sweeping of the beam across the phosphor of the tube 4. This ramp signal is applied to the comparators 110, 210, and 310 over the connection 14 as a comparison signal, and enables the apparatus to produce its records representing the values of the three data signals, as will be explained more fully hereinafter.

Further with respect to the basic operation of the FIG. 1 apparatus, it is noted that, in the absence of any unblanking signal on the connections 18 and 22, the intensity of the beam of the tube 4 is held by the aforementioned usual power supply means at a so-called non-marking level, i.e., a level at which the beam is ineffective. Also, there is normally no unblanking signal on the connections 18 and 22. Accordingly, the beam intensity is normally at a non-marking level, and the beam is normally ineffective. Thus, the tube 4 is normally blanked, and no marking of the sheet 30 occurs.

Whenever and as long as an unblanking signal is present on either the connection 18 to the amplifier 6 or the connection 22 to the amplifier 23, however, the activated amplifier raises or shifts the tube beam intensity to a so-called marking level via the cathode 21 and the corresponding one of the connections 19 and 24, the value of this marking level being determined by the parameters of the apparatus involved. Thus, the tube 4 is shifted from its normal condition, and is unblanked, only as long as an unblanking signal is present on either of the connections 18 and 22.

As long as the beam intensity has a marking level, the beam, under the influence of the sweep signal, effectively produces or marks a line on and across the sheet 30 having an intensity dependent upon the beam intensity. Each of such lines is drawn along that transverse element of the sheet 30 which is then in register with the path of the beam on the phosphor behind the strip 28, and extends from the point along the sweep path at which the tube 4 becomes unblanked to the point along the sweep path at which the unblanking signal disappears and the tube 4 becomes blanked once more. Due to the downward motion of the sheet 30 over the strip 28, each of said lines is, obviously, somewhat slanted on the sheet, and successive lines are displaced in parallel relationship along the length of the sheet by distances determined jointly by the sweep frequency and the speed of the movement of the sheet.

Summarizing the foregoing description, the beam of the tube 4 produces a line on the sheet 30 in each sweep throughout any time in which an unblanking signal is present on one of the connections 18 and 22.

As is explained in more detail in said Tyler et al. patent, each of the channels 1, 2, and 3 produces an unblanking signal in each sweep period or sweep of the tube beam. Considering specifically the operation of the channel 1 as being typical of the operation of all of the channels, it is noted that, in each sweep, the comparator 110 produces an output signal at the time at which the value of the ramp signal reaches the value then had by the input signal which is applied to the comparator 110. If this value of the input signal in a present sweep is different from the value which this input signal had at the time, in the immediately previous sweep, at which the comparator output signal appeared, a dynamic unblanking signal is produced on the connection 18 by the logic device 111 via the connection 115 and the gate 7. This unblanking signal is produced throughout the interval in said present sweep during which the value of the ramp signal lies between the two different successive values of the input signal for said present and immediately previous sweeps, these values being the so-called present and previous input signal values for said present sweep.

The unbanking signal just referred to causes the amplifier 6 to shift the beam intensity from its normal, non-marking level to a predetermined marking level, dependent upon the characteristics of the apparatus, for the duration of the unblanking signal. Thus, in said present sweep, the beam intensity is shifted to the predetermined marking level by the arrival of the ramp signal value at whichever of the present and previous input signal values occurs earlier in that sweep, and is returned to its normal, non-marking level by the arrival of the ramp signal value at the other of said present and previous input signal values.

As a result of the foregoing action, the tube beam produces a dynamic line on the sheet 30 throughout the interval in said present sweep during which the value of the ramp signal lies between said two successive input signal values. Thus, this line is drawn between two points on the sheet 30, the positions of which points across the sheet 30 respectively represent said two successive input signal values. It can be seen that the length of this line across the sheet 30 represents the difference between these two successive values of the input signal.

The foregoing describes the production of a dynamic unblanking signal and a dynamic line on the sheet 30 in each sweep in which a change in the input signal value has occurred since the last sweep. As long as said input signal value is so changing, the tube beam produces successive ones of such dynamic lines on the sheet 30 in successive sweeps, and these lines form the previously noted dynamic trace portions.

Figure 2:
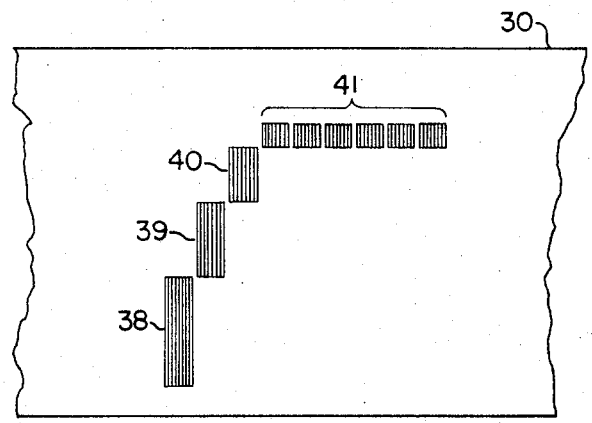
FIGS. 2 and 3 are typical recorded traces.
Figure 3:
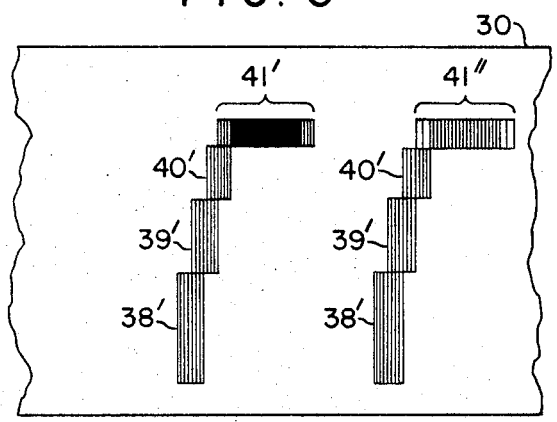

The appearance of a typical dynamic trace portion, representing a typical input signal condition, for two different typical speeds of the sheet 30 is shown by way of example in FIGS. 2 and 3. This dynamic trace portion is made up of three dynamic lines for three consecutive sweeps, these lines being designated 38, 39, and 40 in FIG. 2. The latter shows these lines as they might well appear for the fastest of the several speeds at which the sheet 30 is arranged to be moved.

The same three dynamic lines are shown and designated 38', 39', and 40' in FIG. 3, but there they are shown as they might well appear if the sheet 30 were being moved at a slower speed than that assumed for the illustration of FIG. 2. These two figures illustrate the previously noted fact that the dynamic lines lie in substantially end to end relationship across the sheet 30, and do not overlap, for any speed of movement of the sheet. In both of FIGS. 2 and 3, the thickness of the lines has been magnified to better illustrate the relationships being explained.

In any sweep in which the input signal value is the same as it was in the immediately previous sweep, no dynamic unblanking signal is produced, the amplifier 6 does not shift the beam intensity, and no dynamic line is produced on the sheet 30. This is so because, in such a sweep, the present and previous values of the input signal are the same, whereby the ramp signal arrives at the present and previous values simultaneously.

The appearance in any sweep of the output signal of the comparator 110 causes the static trace capacitor 113 and resistor 112 to produce a pulse on the connection 116 having a fixed duration which is dependent upon the values of this capacitor and resistor. This pulse acts through the gate 17 to produce a static unblanking signal on the connection 22 for the fixed duration of the pulse. This duration is made to be sufficiently short that, for any sweep wherein a dynamic unblanking signal is produced, the action of the amplifier 23 in response to the static unblanking signal does not significantly affect the beam intensity, and the latter is effectively controlled only by the amplifier 6 in response to the dynamic unblanking signal.

For each of those sweeps in which the input signal value is the same as it was in the immediately previous sweep, and in which no dynamic unblanking signal is therefore produced, the static unblanking signal causes the amplifier 23 to shift the beam intensity from its normal, non-marking level to a predetermined static marking level, dependent upon the adjustment of the amplifier 23 as will be described more fully below, for the fixed duration of the static unblanking signal. As a result, the tube beam produces a static line across the sheet 30 in that sweep throughout the fixed duration of the static unblanking signal, the length of this line being determined by said duration, and the intensity of this line being dependent upon said adjustment of the amplifier 23. Desirably, this duration is made sufficiently short that the static line appears as a comparatively short dash or a dot. Such a line lies at a position across the sheet 30 which represents the unchanged value of the input signal, since the static unblanking signal is produced by the appearance of the comparator 110 output signal.

As long as said input signal value remains constant and unchanging for successive sweeps, the tube beam produces successive ones of such static lines in these successive sweeps. Although these static lines extend across the sheet 30, successive lines lie along a path which extends in the direction of movement of the sheet 30, the position of this path across the sheet representing the corresponding constant value of the input signal. These successive static lines therefore form one of the previously noted static trace portions, which appears as a longitudinal line extending along said path and representing the corresponding constant value of the input signal. Each different constant value for the input signal produces a corresponding one of these longitudinal lines or static trace portions.

FIGS. 2 and 3 illustrate the appearance of a typical static trace portion for the two speeds of the sheet 30 which were previously referred to. This static trace portion is shown in FIG. 2 as being composed of six static lines which have been collectively designated 41 in FIG. 2. The latter shows these lines as they might well appear for said fastest sheet speed. The same six lines, collectively designated 41', are also shown in FIG. 3, but here they are shown to be overlapping, due to the fact that the sheet 30 is here assumed to be moving at said slower speed. These figures illustrate the previously explained fact that the static lines of a given static trace portion overlap along their path in the direction of movement of the sheet 30 to an extent which increases as the speed of the sheet 30 decreases. It is this overlapping which causes the static trace portions undesirably to appear progressively denser and darker relative to the non-overlapping dynamic trace portions for progressively slower speeds of the sheet 30, as has been illustrated at 41'.

In accordance with the present invention, this undesirable contrast between the dynamic and static trace portions is eliminated in the FIG. 1 apparatus by providing means to adjust the amplifier 23 in accordance with the speed of movement of the sheet 30 so that this speed determines the previously noted static marking level to which the amplifier 23 shifts the tube beam intensity when the static lines are being produced. This means includes a connection 42 between the knob 36, which sets the speed of the sheet 30, and a portion of the amplifier 23 which sets the beam intensity static marking level. By virtue of this construction, the value of this static marking level and the intensity of the static lines are suitably decreased as the speed of the sheet 30 is decreased, to the extent that the density of the static trace portions is kept substantially the same as the density of the dynamic trace portions for all of the speeds of the sheet 30. This illustrated in FIG. 3 by the trace including the static portion 41''.

Therefore, as the knob 36 is set to different positions to provide different speeds of the sheet 30, the amplifier 23 is automatically adjusted to make the beam intensity static marking level, and the intensity of the static lines, a direct function of the speed of the sheet 30 as necessary to substantially eleminate said undesirable contrast between the dynamic and static trace portions for the speeds at which the sheet 30 is moved.

Figure 4:
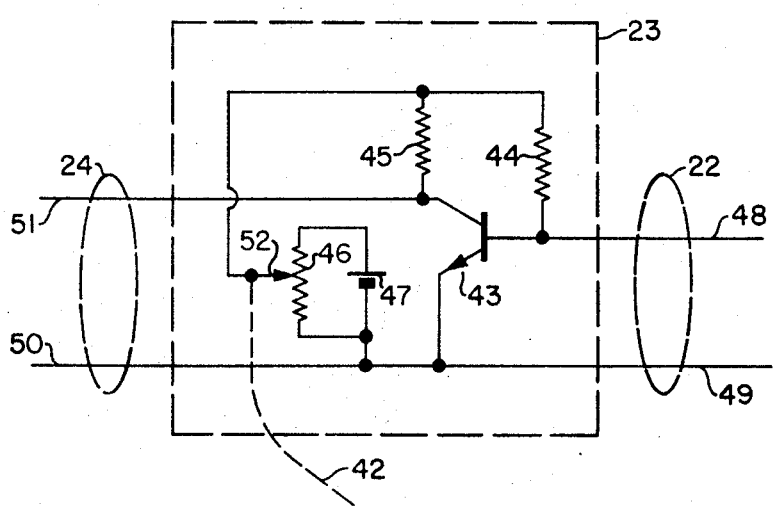
FIG. 4 is a diagram of a portion of the FIG. 1 apparatus.

The Amplifier of FIG. 4

An example of one form which the adjustable unblanking amplifier 23 may take is shown in FIG. 4. In that figure, the amplifier 23 is shown as including a transistor 43, fixed resistors 44 and 45, a potentometric or slide wire adjustable resistor 46, and a power source which is shown as a battery 47. In this amplifier 23, one conductor 48 of the input connection 22 is connected to the base of the transistor 43, while the other conductor 49 of the connection 22 is a common conductor which is connected to the transistor emitter, to one terminal of the battery 47, and to one conductor 50 of the output connection 24. The other conductor 51 of the latter is connected to the transistor collector. The variable resistor 46 is connected across the battery 47. The resistor 46 has an adjustable contact 52 which is connected through the resistor 44 to the transistor base, and through the resistor 45 to the transistor collector. The contact 52 is mechanically coupled to the connection 42 which, in turn, is connected to the knob 36 of FIG. 1. As the knob 36 is adjusted to select progressively lower speeds for the sheet 30, the contact 52 is progressively moved downward along the resistor 46.

As previously noted, there is normally no unblanking signal on the connection 22. As a result, the transistor 43 is normally off, and no signal is applied over the connection 24 to raise the intensity of the tube beam above its normal non-marking level. When an unblanking signal appears on the connection 22, however, this signal turns on the transistor 43, with the result that the later, via the connection 24, then drives the cathode 21 of the tube 4 sufficiently negative to shift the beam intensity from its normal non-marking level to a static marking level of a value dependent upon the adjusted position of the contact 52. Thus, the static marking level is dependent upon the speed of the sheet 30. Specifically, the lower this speed is made, the further down the contact 52 is positioned along the resistor 46, and the lower is the value of the static marking level and the marking intensity of the beam.

When the unblanking signal disappears from the connection 22, the transistor 43 returns to its normal off state, and the beam intensity returns to its normal non-marking level.

It is seen from the foregoing that the amplifier 23 is a means which is adjusted in accordance with the speed of movement of the sheet 30 so as to cause the apparatus to make the density of the static trace portions desirably substantially the same as the density of the dynamic trace portions irrespective of said speed. It is noted that, if desired, the amplifier 23 may be controlled or adjusted electrically instead of mechanically, and may be adjusted in accordance with the speed of the sheet 30 by means other than the speed setting device, such as a means which senses the actual speed of the sheet. Also, an arrangement of the type shown in FIGS. 1 and 10 of said Tyler et al patent, having but a single unblanking amplifier, may be made to embody the present invention by connecting this single amplifier to be adjusted by or responsive to the record sheet speed only for unblanking signals to the amplifier which are not dynamic ones.

Although the foregoing description has dealt specifically with the operation of the FIG. 1 apparatus with respect to an input signal in the channel 1, it is noted that an appropriate dynamic or static line is produced in each sweep for the signal in the channel 2 and for the signal in the channel 3 as well. The successive lines produced by the operation of each channel together form a trace for that channel which represents the signal value in that channel as that value varies with time. The OR gate 17 provides coupling between the three channels and the amplifier 23 for static line purposes in the same manner as the OR gate 7 provides coupling, as explained in said Tyler et al patent, between the three channels and the amplifier 6 for dynamic line purposes.

In conclusion, it is seen that the improved recording apparatus according to the present invention fulfills the objects set forth herein by producing records whereon both the dynamic and static trace portions have substantially the same density for any of the several speeds with which the record medium may be moved. Moreover, this improved apparatus provides such uniform density traces without requiring the making of unduly complicated or extensive changes to the previously known apparatus.

I claim:

1. Recording apparatus for producing on a moving record medium a trace representing the value of a data signal as said value varies with time, comprising means supporting and moving a record medium in a pre-determined fixed direction at any of at least two selectable speeds, marking means positioned relative to said medium to mark the latter only when said marking means is supplied with a marking signal, the intensity with which said marking means so marks said medium being determined by the value of said marking signal, sweep means connected to said marking means to effectively sweep the later recurrently in successive sweep periods along a path across said medium which is substantially transverse to said direction of medium movement, whereby, during each of said periods, said marking means produces a line along said path only throughout the time in that period in which said marking means is supplied with said marking signal, the intensity of said line being determined by the value of the marking signal producing it, variable value marking signal producing means connected to said marking means and to a source of a data signal and responsive to the value of said data signal to supply a variable value marking signal to said marking means for a predetermined, fixed, relatively short interval during each of said periods starting at a time therein dependent upon the value of said data signal in that period, said variable value marking signals thus causing said marking means to produce substantially parallel static lines across said medium, adjacent ones of which overlap in said direction of medium movement to an extent which increases as said medium speed decreases, control means connected to be responsive to said medium speed and connected to said variable value marking signal producing means to vary the value of said marking signal supplied thereby as a direct function of said medium speed, whereby the lastmentioned marking signal value decreases as said medium speed decreases, and fixed value marking signal producing means connected to said marking means and to said source of said data signal and responsive to the value of said data signal to supply a marking signal, of a fixed value which is independent of said medium speed, to said marking means throughout a portion of each of ones of said periods, said portion having a length dependent upon the difference between the data signal value in that period and the data signal value in the immediately preceding period, and starting at a time in its period dependent upon one of the lastmentioned two data signal values, said fixed value marking signals thus causing said marking means to produce substantially parallel dynamic lines across said medium, adjacent ones of which never overlap in said direction of medium movement for any of said medium speeds, whereby the density of the trace portions formed by said overlapping static lines is made to be substantially the same as the density of the trace portions formed by said non-overlapping dynamic lines for all of said medium speeds.

2. Recording apparatus for producing on a moving record medium a trace representing the condition of a data signal as said condition varies with time, comprising generating means for producing a ramp signal the value of which repeatedly sweeps progressively between first and second values in each of successive sweep periods, cathode ray tube means, means supporting a record medium relative to said tube means, said tube means including beam producing means for producing a cathode ray tube beam only when an unblanking signal is applied to said beam producing means, said tube means also including deflecting means connected to said generating means for effectively sweeping said beam in synchronism with said sweeping of said ramp signal to cause said beam, as long as it is produced during each of said periods, to produce a trace line on said medium along a path and with an intensity dependent upon the value of said unblanking signal, means for moving said medium relative to said tube means at any of at least two selectable speeds in a direction substantially at right angles to said path, comparing means connected to receive said ramp signal and an input signal representing the condition of a data signal for producing an output signal upon the occurrence in each of said sweep periods of a predetermined relationship between the values of said input and ramp signals, variable value unblanking signal producing means connected to said comparing means to receive said output signals and connected to said beam producing means to supply thereto a variable value unblanking signal for a predetermined, fixed, relatively short interval during each of said periods starting upon receipt of said output signal in that period, said variable value unblanking signals thus causing said beam to produce substantially parallel static lines across said medium, adjacent ones of which overlap in the direction of medium movement to an extent which increases as said medium speed decreases, control means connected to be responsive to said medium speed and connected to said variable value unblanking signal producing means to vary the value of said unblanking signal supplied thereby as a direct function of said medium speed, whereby the last-mentioned unblanking signal value decreases as said medium speed decreases, and fixed value unblanking signal producing means connected to said comparing means to receive said output signals and connected to said beam producing means to supply thereto an unblanking signal of a fixed value, which is independent of said medium speed, throughout a portion of each of ones of said periods, said portion having a length dependent upon the difference between the time of occurrence of said output signal in that period and the time of occurrence of said output signal in the immediately preceding period, and starting at a time in its period dependent upon one of the last-mentioned two times of output signal occurrence, said fixed value unblanking signals thus causing said beam to produce substantially parallel dynamic lines across said medium, adjacent ones of which never overlap in said direction of medium movement for any of said medium speeds, whereby the density of the trace portions formed by said overlapping static lines is made to be substantially the same as the density of the trace portions formed by said non-overlapping dynamic lines for all of said medium speeds.

* * * * *